US009882688B2

(12) United States Patent
Lau et al.

(10) Patent No.: US 9,882,688 B2
(45) Date of Patent: Jan. 30, 2018

(54) METHOD, APPARATUS, AND SYSTEM FOR PROCESSING INTERFERENCE IN MASSIVE MULTIPLE-INPUT MULTIPLE-OUTPUT SYSTEM

(71) Applicant: Huawei Technologies Co., Ltd., Shenzhen, Guangdong (CN)

(72) Inventors: Kin Nang Lau, Hong Kong (HK); An Liu, Hong Kong (HK); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/269,191

(22) Filed: Sep. 19, 2016

(65) Prior Publication Data
US 2017/0005762 A1 Jan. 5, 2017

Related U.S. Application Data

(63) Continuation of application No. PCT/CN2014/073764, filed on Mar. 20, 2014.

(51) Int. Cl.
*H04B 7/02* (2017.01)
*H04L 5/00* (2006.01)
(Continued)

(52) U.S. Cl.
CPC ......... *H04L 5/0032* (2013.01); *H04B 7/0413* (2013.01); *H04B 7/0452* (2013.01);
(Continued)

(58) Field of Classification Search
CPC .. H04B 7/0456; H04B 7/0413; H04B 7/0452; H04B 7/0617; H04B 7/065; H04L 25/03; H04L 5/0032; H04L 47/50

See application file for complete search history.

(56) References Cited

U.S. PATENT DOCUMENTS

2006/0023669 A1* 2/2006 Yamaura ............... H04B 7/0693
370/335
2008/0187062 A1* 8/2008 Pan ....................... H04B 7/0417
375/260

(Continued)

FOREIGN PATENT DOCUMENTS

CN 101834707 A 9/2010
CN 101873190 A 10/2010

(Continued)

OTHER PUBLICATIONS

Long, H., et al., "Precoding Vector Distribution under Spatial Correlated Channel and Nonuniform Codebook Design," IEEE International Conference on Communications, 2008, May 19-23, 2008, pp. 4506-4510.

(Continued)

*Primary Examiner* — Helene Tayong

(57) ABSTRACT

The present invention relates to the field of communications technologies, and discloses a method, an apparatus, and a system for suppressing interference in a massive multiple-input multiple-output system, which overcome a disadvantage of sensitivity to a backhaul delay during an inter-cell interference cancellation process in an existing massive multiple-input multiple-output system. A specific embodiment of the present invention includes: obtaining channel correlation matrixes of all links, and further calculating a combined outer precoder set according to the channel correlation matrixes, where each combined outer precoder includes at least one outer precoder, and the outer precoder is a semi-unitary matrix and is not sensitive to a backhaul delay. Technical solutions of the present invention are mainly applied to a process of processing interference in a massive multiple-input multiple-output system.

13 Claims, 8 Drawing Sheets

(51) Int. Cl.

| | | |
|---|---|---|
| *H04L 25/03* | (2006.01) | |
| *H04B 7/0456* | (2017.01) | |
| *H04B 7/0413* | (2017.01) | |
| *H04L 12/863* | (2013.01) | |
| *H04B 7/0452* | (2017.01) | |
| *H04B 7/06* | (2006.01) | |
| *H04W 88/08* | (2009.01) | |

(52) U.S. Cl.
CPC ........... *H04B 7/0456* (2013.01); *H04B 7/065* (2013.01); *H04B 7/0617* (2013.01); *H04L 25/03* (2013.01); *H04L 47/50* (2013.01); *H04W 88/08* (2013.01)

(56) References Cited

U.S. PATENT DOCUMENTS

| | | | | |
|---|---|---|---|---|
| 2009/0080558 | A1* | 3/2009 | An | H04L 1/0625 375/267 |
| 2012/0219042 | A1 | 8/2012 | Onggosanusi et al. | |
| 2012/0250743 | A1 | 10/2012 | Heath et al. | |
| 2015/0131753 | A1* | 5/2015 | Maruta | H04B 7/0473 375/267 |
| 2015/0180561 | A1* | 6/2015 | Jindal | H04L 25/03898 375/267 |

FOREIGN PATENT DOCUMENTS

| | | |
|---|---|---|
| CN | 102255642 A | 11/2011 |
| WO | 2011126160 A1 | 10/2011 |
| WO | 2013179806 A1 | 12/2013 |

OTHER PUBLICATIONS

"Further Performance Evaluation for CSI Enhancement Proposals," 3GPP TSG RAN WG1 #62 Meeting, R1-105017, Texas Instruments, Madrid, Spain, Aug. 23-27, 2010, 20 pages.

"Possible Refinement on 8Tx Codebook Design," 3GPP TSG RAN WG1 60bis, R1-102104, Texas Instruments, Beijing, China, Apr. 12-16, 2010, 7 pages.

"A Feedback Framework Based on W2W1 for Rel. 10," 3GPP TSG RAN WG1 Meeting #61bis, R1-103664, Samsung, Dresden, Germany, Jun. 28-Jul. 2, 2010, 19 pages.

* cited by examiner

METHOD, APPARATUS, AND SYSTEM FOR PROCESSING INTERFERENCE IN MASSIVE MULTIPLE-INPUT MULTIPLE-OUTPUT SYSTEM

CROSS-REFERENCE TO RELATED APPLICATIONS

This application is a continuation of International Application No. PCT/CN2014/073764, filed on Mar. 20, 2014, the disclosure of which is hereby incorporated by reference in its entirety.

TECHNICAL FIELD

The present invention relates to the field of communications technologies, and in particular, to a method, an apparatus, and a system for processing interference in a massive multiple-input multiple-output system.

BACKGROUND

As mobile data applications are exponentially growing, to ensure network access experience of a large quantity of users, spectrum utilization per unit area of an existing wireless system needs to be greatly increased through the breakthrough development of wireless technologies. Therefore, a massive multiple-input multiple-output (Massive Multiple-input Multiple-output, Massive MIMO for short) system technology is introduced. The technology is considered one of key technologies of a fifth-generation mobile wireless communications system. Specifically, in a massive multiple-input multiple-output system, a base station is equipped with antennas of one order of magnitude more than those in an existing system, for example, hundreds of antennas.

The use of the massive multiple-input multiple-output technology can greatly improve spectrum utilization and system power efficiency, but during the use of the massive multiple-input multiple-output system, interference is a fundamental bottleneck limiting performance of the system. In the massive multiple-input multiple-output system, inter-cell interference (Inter-cell interference, ICI for short) exists between different base stations.

In a conventional cellular wireless system, a method for cancelling inter-cell interference is frequency reuse, but this method has relatively low spectrum utilization, and cannot meet a requirement of a next-generation wireless communications system. To improve spectrum utilization, a coordinated multi-point transmission (Coordinated Multi-Point Transmission, CoMP for short) technology is used in the next-generation wireless communications system. CSI (Channel State Information, channel state information) needs to be exchanged between base stations to implement this technology. In a process in which base stations exchange CSI, because a delay exists on a backhaul, CSI of other base stations obtained by a base station by using a backhaul connection is not exactly the same as current CSI of these base stations, which causes an error in the CSI obtained by the base station. Therefore, performance of CoMP is degraded. A greater delay on the Backhaul results in a greater error in the CSI obtained by the base station and poorer performance of CoMP. That is, CoMP is very sensitive to a backhaul delay. In the massive multiple-input multiple-output system, there is an urgent need to design an inter-cell interference cancellation solution that is not sensitive to a backhaul delay.

SUMMARY

Embodiments of the present invention provide a method, an apparatus, and a system for suppressing interference in a massive multiple-input multiple-output system, which overcome a disadvantage of sensitivity to a backhaul delay during an inter-cell interference cancellation process in an existing massive multiple-input multiple-output system.

To achieve the foregoing objective, the following technical solutions are used in the embodiments of the present invention.

According to a first aspect, an apparatus for processing interference in a massive multiple-input multiple-output system is provided, including:

an obtaining unit, configured to obtain channel correlation matrixes of all links; and a calculation unit, configured to calculate a combined outer precoder set by using the channel correlation matrixes of all links obtained by the obtaining unit, where each combined outer precoder includes at least one outer precoder, and the outer precoder is a semi-unitary matrix.

In a first possible implementation manner of the first aspect, the apparatus includes:

the calculation unit is further configured to calculate, by using the channel correlation matrixes of all links obtained by the obtaining unit, a use probability corresponding to each combined outer precoder.

With reference to the first aspect or the first possible implementation manner of the first aspect, in a second possible implementation manner of the first aspect, the apparatus further includes:

a sending unit, further configured to determine a super frame, and send the combined outer precoder set and the use probability of each combined outer precoder to a base station in the super frame.

According to a second aspect, an apparatus for processing interference in a massive multiple-input multiple-output system is provided, including:

an obtaining unit, configured to obtain a combined outer precoder set and a use probability of each combined outer precoder, where the combined outer precoder includes at least one outer precoder, and the outer precoder is a semi-unitary matrix.

In a first possible implementation manner of the second aspect, the apparatus includes:

a determining unit, configured to determine a currently used outer precoder according to the combined outer precoder set and the use probability of each combined outer precoder that are obtained by the obtaining unit; and a calculation unit, configured to perform calculation by using the currently used outer precoder determined by the determining unit, to obtain an equivalent channel; and further configured to perform calculation by using the equivalent channel, to obtain an inner precoder.

With reference to the second aspect or the first possible implementation manner of the second aspect, in a second possible implementation manner of the second aspect, the apparatus further includes:

a sequence generation subunit, configured to generate a pseudo-random sequence by using the combined outer precoder in the combined outer precoder set and the use probability of each combined outer precoder that are obtained by the obtaining unit, where a length value of the pseudo-random sequence is equal to a quantity of radio frames included in a super frame;

the super frame is a time period during which the combined outer precoder set and the use probability of the combined outer precoder are obtained; and the super frame includes one or more radio frames; and a determining subunit, configured to determine the currently used outer precoder according to a location of a current radio frame in the super frame and the pseudo-random sequence.

With reference to the second aspect or the first possible implementation manner of the second aspect, in a third possible implementation manner of the second aspect, the calculation unit further includes:

a scheduling subunit, configured to schedule a user by using a service queue status and the equivalent channel obtained by the calculation unit; and a calculation subunit, configured to calculate the inner precoder by using the current user scheduling in the scheduling subunit and the equivalent channel of the scheduled user.

According to a third aspect, an apparatus for processing interference in a massive multiple-input multiple-output system is provided, including:

a processor, configured to obtain channel correlation matrixes of all links, and calculate a combined outer precoder set by using the channel correlation matrixes of all links, where each combined outer precoder includes at least one outer precoder, and the outer precoder is a semi-unitary matrix.

In a first possible implementation manner of the third aspect, the processor is further configured to calculate, by using the channel correlation matrixes of all links, a use probability corresponding to each combined outer precoder.

With reference to the third aspect or the first possible implementation manner of the third aspect, in a second possible implementation manner of the third aspect, the apparatus further includes:

a transmitter, further configured to determine a super frame, and send the combined outer precoder set and the use probability of the combined outer precoder to a base station in the super frame.

According to a fourth aspect, an apparatus for processing interference in a massive multiple-input multiple-output system is provided, including:

a processor, configured to obtain a combined outer precoder set and a use probability of a combined outer precoder, where the combined outer precoder includes at least one outer precoder, and the outer precoder is a semi-unitary matrix.

In a first possible implementation manner of the fourth aspect, the apparatus further includes:

the processor, configured to determine a currently used outer precoder according to the combined outer precoder set and the use probability of each combined outer precoder that are obtained, and perform calculation by using the currently used outer precoder, to obtain an equivalent channel; and further configured to perform calculation by using the equivalent channel, to obtain an inner precoder.

With reference to the fourth aspect or the first possible implementation manner of the fourth aspect, in a second possible implementation manner of the fourth aspect, the processor is further configured to generate a pseudo-random sequence by using the combined outer precoder in the combined outer precoder set and the use probability of each combined outer precoder, where a length value of the pseudo-random sequence is equal to a quantity of radio frames included in a super frame;

the super frame is a time period during which the combined outer precoder set and the use probability of the combined outer precoder are obtained; and the super frame includes one or more radio frames; and the processor is further configured to determine the currently used outer precoder according to a location of a current radio frame in the super frame and the pseudo-random sequence.

With reference to the fourth aspect or the first possible implementation manner of the fourth aspect, in a third possible implementation manner of the fourth aspect, the processor is further configured to schedule a user by using a service queue status and the equivalent channel, and calculate the inner precoder by using the current user scheduling and the equivalent channel of the scheduled user.

According to a fifth aspect, a system for processing interference in a massive multiple-input multiple-output system is provided, including the apparatus for processing interference in a massive multiple-input multiple-output system provided in the first aspect or any one or more of the possible implementation manners of the first aspect, and the apparatus for processing interference in a massive multiple-input multiple-output system provided in the second aspect or any one or more of the possible implementation manners of the second aspect.

According to a sixth aspect, a system for processing interference in a massive multiple-input multiple-output system is provided, including the apparatus for processing interference in a massive multiple-input multiple-output system provided in the third aspect or any one or more of the possible implementation manners of the third aspect, and the apparatus for processing interference in a massive multiple-input multiple-output system provided in the fourth aspect or any one or more of the possible implementation manners of the fourth aspect.

According to a seventh aspect, a method for processing interference in a massive multiple-input multiple-output system is provided, including:

obtaining channel correlation matrixes of all links; and calculating a combined outer precoder set by using the channel correlation matrixes of all links, where each combined outer precoder includes at least one outer precoder, and the outer precoder is a semi-unitary matrix.

In a first possible implementation manner of the seventh aspect, the method further includes:

calculating a use probability corresponding to each combined outer precoder by using the channel correlation matrixes of all links.

With reference to the seventh aspect or the first possible implementation manner of the seventh aspect, in a second possible implementation manner of the seventh aspect, the method further includes:

determining a super frame, and sending the combined outer precoder set and the use probability of the combined outer precoder to a base station in the super frame.

According to an eighth aspect, a method for processing interference in a massive multiple-input multiple-output system is provided, where the method includes:

obtaining a combined outer precoder set and a use probability of each combined outer precoder, where the combined outer precoder includes at least one outer precoder, and the outer precoder is a semi-unitary matrix.

In a first possible implementation manner of the eighth aspect, the method further includes:

determining a currently used outer precoder according to the combined outer precoder set and the use probability of each combined outer precoder that are obtained, and performing calculation by using the currently used outer precoder, to obtain an equivalent channel; and performing calculation by using the equivalent channel, to obtain an inner precoder.

With reference to the eighth aspect or the first possible implementation manner of the eighth aspect, in a second possible implementation manner of the eighth aspect, the determining a currently used outer precoder includes:

generating a pseudo-random sequence by using the combined outer precoder in the combined outer precoder set and the use probability of each combined outer precoder, where a length value of the pseudo-random sequence is equal to a quantity of radio frames included in a super frame; the super frame is a time period during which the combined outer precoder set and the use probability of the combined outer precoder are obtained; and the super frame includes one or more radio frames; and determining the currently used outer precoder according to a location of a current radio frame in the super frame and the pseudo-random sequence.

With reference to the eighth aspect or the first possible implementation manner of the eighth aspect, in a third possible implementation manner of the eighth aspect, the performing calculation by using the equivalent channel, to obtain an inner precoder includes:

scheduling a user by using a service queue status and the equivalent channel; and calculating the inner precoder by using the current user scheduling and the equivalent channel of the scheduled user.

According to the method, apparatus, and system for processing interference in a massive multiple-input multiple-output system that are provided in the embodiments of the present invention, a radio resource management server obtains channel correlation matrixes of all links, calculates a combined outer precoder set according to these channel correlation matrixes, where each combined outer precoder includes at least one outer precoder, and the outer precoder is a semi-unitary matrix, and sends the combined outer precoder set to a base station, so that the base station can perform adjustment according to the combined outer precoder set. The technical solutions provided in the embodiments of the present invention overcome a disadvantage of sensitivity to a backhaul delay during an inter-cell interference cancellation process in a massive multiple-input multiple-output system.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
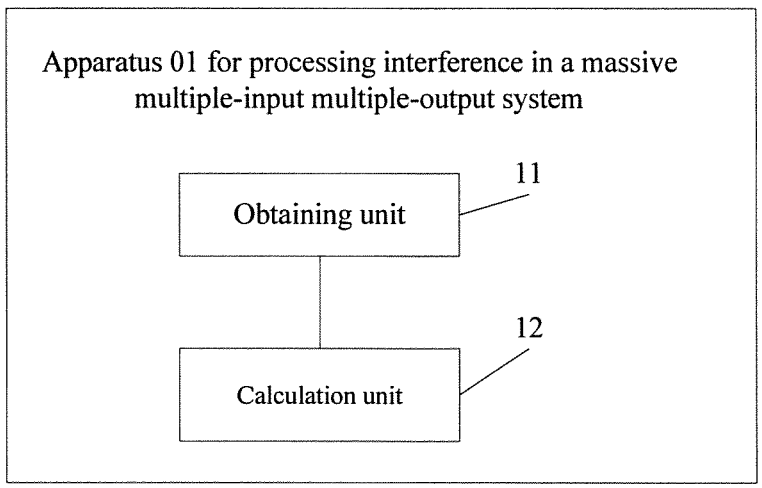
FIG. 1 is a schematic composition diagram of an apparatus for processing interference in a massive multiple-input multiple-output system according to an embodiment of the present invention.

An embodiment of the present invention provides an apparatus for processing interference in a massive multiple-input multiple-output system. As shown in FIG. 1, the apparatus 01 includes: an obtaining unit 11 and a calculation unit 12.

The obtaining unit 11 is configured to obtain channel correlation matrixes of all links.

The channel correlation matrixes of all links refer to channel correlation matrixes of all users in all cells in the massive multiple-input multiple-output system, and a channel correlation matrix indicates a quantity of base station antennas that can be received by users served by each base station.

It should be noted that the obtained channel correlation matrixes change slowly and are not sensitive to a delay.

The calculation unit 12 is configured to calculate a combined outer precoder set by using the channel correlation matrixes of all links obtained by the obtaining unit 11.

Each combined outer precoder includes at least one outer precoder, and the outer precoder is not sensitive to a backhaul delay. In addition, through the calculation of the calculation unit, at least one combined outer precoder may be obtained, or multiple combined outer precoders may be obtained. The multiple combined outer precoders may be referred to as a combined outer precoder set.

It should be noted that the outer precoders are outer precoders of all base stations, and the outer precoders of all base stations are designed according to the channel correlation matrixes of all links in the system. The outer precoders are not sensitive to a backhaul delay, and a function of the outer precoders is to cancel inter-cell interference.

Specifically, the outer precoders are not sensitive to a backhaul delay because the outer precoders are adaptive to only the channel correlation matrixes and are unrelated to real-time channel state information. Because the channel correlation matrixes usually change significantly only after hundreds or even thousands of radio frames, the outer precoders are not sensitive to a delay. For example, the users estimate the channel correlation matrixes at a moment 0. It is assumed that due to a processing and transmission delay, a radio resource management server RRMS (Radio Resource Management Server) receives the channel correlation matrixes after a time T. However, because the channel correlation matrixes change quite slowly, channel correlation matrixes at a moment T are almost the same as the channel correlation matrixes at the moment 0. Therefore, current outer precoders may be designed for the RRMS according to the channel correlation matrixes at the moment 0, which means that the outer precoders are not sensitive to a delay.

The outer precoders of the base stations are semi-unitary matrixes.

Specifically, a semi-unitary matrix has the following features:

an M×S (M rows and S columns) semi-unitary matrix U meets the following features: (1) S<M; and (2) a product of a conjugate transpose of U and U is an S×S unit matrix.

For example, [1 0
0 1
0 0] is a semi-unitary matrix.

It should be noted that multiple combined outer precoders can be calculated according to the channel correlation matrixes of all links. Such multiple combined outer precoders are referred to as a combined outer precoder set, which is used to maximize a performance indicator of the massive multiple-input multiple-output system in this embodiment. A specific manner for calculating the outer precoders are related to a selected system performance indicator. Common system performance indicators include a system throughput and proportional fairness.

Figure 2:
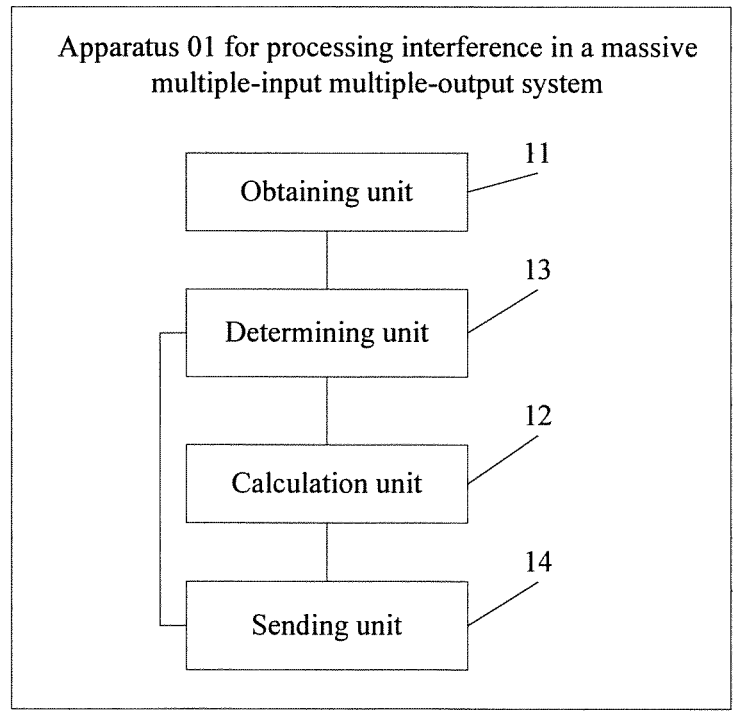
FIG. 2 is a schematic composition diagram of another apparatus for processing interference in a massive multiple-input multiple-output system according to an embodiment of the present invention.

Optionally, as shown in FIG. 2, the apparatus further includes: a determining unit 13 and a sending unit 14.

The determining unit 13 is configured to calculate, by using the channel correlation matrixes of all links obtained by the obtaining unit 11, a use probability corresponding to each combined outer precoder.

The use probability corresponding to each combined outer precoder is calculated. The calculation of the use probability is determined by a system performance indicator, and a specific calculation method is related to a specific application and a selected system performance indicator. The use probability and the combined outer precoder set maximize the performance indicator of the massive multiple-input multiple-output system.

The sending unit 14 is configured to determine a super frame, and send the combined outer precoder set and the use probability of the combined outer precoder that are obtained by the calculation unit 12 to a base station in the super frame.

The super frame includes one or more radio frames.

It should be noted that a super frame is an updating period of the outer precoders. The outer precoders are not static, but need to be constantly adjusted in a self-adaptive manner according to the channel correlation matrixes. In this embodiment, when each super frame begins, an outer precoder matrix is calculated, and then remains unchanged during the entire super frame. However, after a next super frame begins, the channel correlation matrixes may have changed significantly, and outer precoder matrix calculation needs to be performed again.

Besides, it should be noted that the apparatus 01 described in this embodiment is preferably an RRMS.

According to the apparatus for processing interference in a massive multiple-input multiple-output system provided in this embodiment of the present invention, an obtaining unit obtains channel correlation matrixes of all links, then calculates a combined outer precoder set by using the obtained channel correlation matrixes of all links, calculates a use probability of each combined outer precoder, and sends the combined outer precoder set and the use probability of the combined outer precoder to a base station. An outer precoder in this embodiment of the present invention is not sensitive to a backhaul delay, which significantly reduces an error in channel state information obtained by the base station, and further can significantly cancel inter-cell interference.

Figure 3:
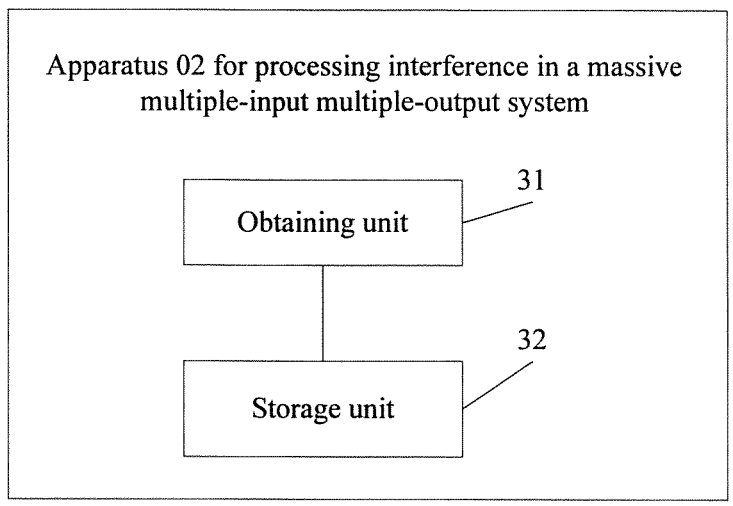
FIG. 3 is a schematic composition diagram of an apparatus for processing interference in a massive multiple-input multiple-output system according to another embodiment of the present invention.

Another embodiment of the present invention provides an apparatus for processing interference in a massive multiple-input multiple-output system. As shown in FIG. 3, the apparatus 02 includes: an obtaining unit 31 and a storage unit 32.

The obtaining unit 31 is configured to obtain a combined outer precoder set and a use probability of each combined outer precoder.

The combined outer precoder includes at least one outer precoder, the outer precoder is not sensitive to a backhaul delay, and the outer precoder is a semi-unitary matrix.

It should be noted that outer precoders of base stations in a same combined outer precoder are used simultaneously, and therefore, use probabilities of the outer precoders of the base stations in the same combined outer precoder are the same.

Specifically, a manner used by the obtaining unit 31 to obtain the combined outer precoder set and the use probability of each combined outer precoder is: receiving the combined outer precoder set and the use probability of each combined outer precoder that are sent by an RRMS.

Besides, each base station needs to receive only an outer precoder of the base station in the combined outer precoder and a corresponding use probability, and does not need to receive outer precoders of other base stations.

For example, the massive multiple-input multiple-output system includes only two base stations: a base station 1 and a base station 2, and the calculated combined outer precoder set has three combined outer precoders: {F1(1), F2(1)}, {F1(2), F2(2)}, and {F1(3), F2(3)}, where Fn(j) represents an outer precoder of the $n^{th}$ base station in the $j^{th}$ combined outer precoder. In addition, it is assumed that use probabilities of the three combined outer precoders are respectively q1, q2, and q3.

The base station 1 needs to know only F1(1), F1(2), F1(3), and the use probabilities q1, q2, and q3, and does not need to know F2(1), F2(2), or F2(3). Generation of a pseudo-random sequence relies only on the use probabilities q1, q2, and q3, and is unrelated to specific values of the outer precoders. For example, a "pseudo-random sequence" generated by the base station 1 (and the base station 2) is {2, 1, 3, 1 . . . }. In this example, the base stations 1 and 2 generate the same pseudo-random sequences according to a same rule. Then, in the first radio frame, the base station 1 uses F1(2) as an outer precoder, while the base station 2 uses F2(2) as an outer precoder; in the second radio frame, the base station 1 uses F1(1) as an outer precoder, while the base station 2 uses F2(1) as an outer precoder; in the third radio frame, the base station 1 uses F1(3) as an outer precoder, while the base station 2 uses F2(3) as an outer precoder; in the fourth radio frame, the base station 1 uses F1(1) as an outer precoder, while the base station 2 uses F2(1) as an outer precoder. Therefore, each base station needs to know only its own outer precoder set and use probabilities.

The storage unit 32 is configured to store the combined outer precoder set and the use probability of each combined outer precoder that are obtained by the obtaining unit 31.

Figure 4:
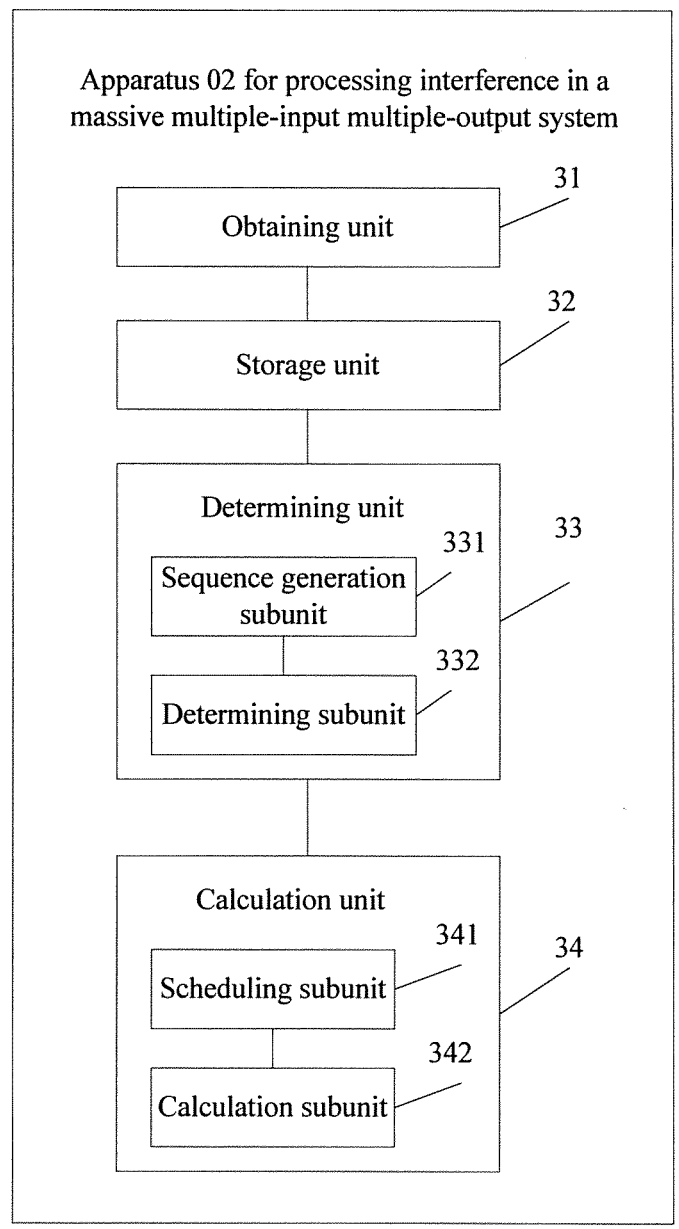
FIG. 4 is a schematic composition diagram of another apparatus for processing interference in a massive multiple-input multiple-output system according to another embodiment of the present invention.

Optionally, as shown in FIG. 4, the apparatus further includes: a determining unit 33 and a calculation unit 34.

The determining unit 33 is configured to determine a currently used outer precoder according to the combined outer precoder set and the use probability of each combined outer precoder that are obtained by the obtaining unit 31.

The calculation unit 34 is configured to perform calculation by using the currently used outer precoder determined by the determining unit 33, to obtain an equivalent channel; and is further configured to perform calculation by using the equivalent channel, to obtain an inner precoder.

A dimension of the involved equivalent channel is represented by a numeric value, and the numeric value is equal to a rank of the outer precoder. Because the outer precoder is a matrix, the rank of the outer precoder is equal to a quantity of columns of the outer precoder matrix.

Besides, in this embodiment, the inner precoder is a matrix. For example, if a base station has K scheduled users, and a dimension of a current outer precoder of the base station is S, the inner precoder is an S×K matrix (a matrix of S rows and K columns). The inner precoder is used to cancel interference between the K scheduled users. The inner precoder may be obtained through calculation according to the equivalent channel by using different design criteria. The calculation criteria include but are not limited to a zero forcing criterion or an MMSE (Minimum Mean Square Error, minimum mean square error) criterion.

Specifically, the determining unit 33 further includes: a sequence generation subunit 331 and a determining subunit 332.

The sequence generation subunit 331 is configured to generate a pseudo-random sequence by using the combined outer precoder in the combined outer precoder set and the use probability of each combined outer precoder that are obtained by the obtaining unit 31.

A length value of the pseudo-random sequence is equal to a quantity of radio frames included in a super frame, and a value of each element of the pseudo-random sequence is included in {1, 2, 3 . . . , J}, where J is a size of the combined outer precoder set, and a probability of each element value being j is equal to a use probability of the $j^{th}$ combined outer precoder.

The super frame is a time period during which the combined outer precoder set and the use probability of the combined outer precoder are obtained, and the super frame includes one or more radio frames.

The determining subunit 332 is configured to determine the currently used outer precoder according to a location of a current radio frame in the super frame and the pseudo-random sequence.

Specifically, with reference to the foregoing description of the pseudo-random sequence, if the current radio frame is the first radio frame of the current super frame, the $n^{th}$ base station determines, according to the first element in the pseudo-random sequence, an outer precoder used in the current radio frame. For example, if the first element in a current pseudo-random sequence is j_1, the base station uses the $n^{th}$ outer precoder in the $(j\_1)^{th}$ combined outer precoder in the combined outer precoder set.

With reference to the foregoing example, the $n^{th}$ base station needs to use only the $n^{th}$ outer precoder in the combined outer precoder, and therefore does not need to know outer precoders of other base stations in the combined outer precoder.

Further, after the determining subunit 332 determines the currently used outer precoder, the calculation unit 34 further determines the equivalent channel of a user by using the outer precoder.

Preferably, the equivalent channel is obtained by using a product of an original channel and the outer precoder, and the equivalent channel completes data communication between user equipment and a base station, in place of the original channel. For example, if an outer precoder matrix of the $n^{th}$ base station is F_n, and a channel between the $n^{th}$ base station and the $k^{th}$ user is H_k,n, an equivalent channel between the $n^{th}$ base station and the $k^{th}$ user is F_n*H_k,n.

It should be noted that the dimension of the equivalent channel is equal to a rank of the outer precoder matrix, and is far less than a quantity of base station antennas. Besides, the equivalent channel is used to cancel interference between multiple users in a cell and implement multi-user transmission through spatial multiplexing of a base station.

The calculation unit 34 further includes: a scheduling subunit 341 and a calculation subunit 342.

The scheduling subunit 341 is configured to schedule a user by using the obtained equivalent channel and a service queue status.

It should be noted that the base station maintains a service queue status for each user, that is, a service queue is located in the base station, and therefore, each base station knows a service queue status of a user served by the base station.

Both a system throughput and fairness between users need to be considered during user scheduling. A user scheduling calculation method includes but is not limited to an existing user scheduling solution in an LTE (Long-term evolution, Long Term Evolution) system. The user scheduling calculation method may be designed flexibly, and is not limited in this embodiment of the present invention.

It should be noted that both a system throughput and fairness between users need to be considered during the scheduling, to ensure that more users can perform normal services.

The calculation subunit 342 is configured to calculate the inner precoder by using the current user scheduling in the scheduling subunit 341 and the equivalent channel of the scheduled user.

It should be noted that during the user scheduling, equivalent channel information of all users needs to be used; after the user scheduling is completed, only an inner precoder needs to be calculated for a scheduled user, and in this case, only equivalent channel information of the scheduled user needs to be used.

Specifically, a method for calculating the inner precoder may be designed flexibly, for example, a precoding solution in the LTE system may be used.

It should be noted that the apparatus 02 described in this embodiment is preferably a base station.

It should be noted that an existing base station needs to cancel interference between multiple users in the cell according to CSI of a part of a local cell, but with the increase in a quantity of base station antennas, a dimension of CSI that needs to be estimated exceeds a quantity of available pilots in a channel coherent time, which causes a relatively great error in estimated CSI learned by the base station; consequently, interference in the cell cannot be cancelled. The dimension of the CSI is equal to the quantity of antennas. In a massive antenna system, the quantity of antennas, that is, the dimension of the CSI, is far greater than a dimension of an equivalent channel. The apparatus 02 provided in this embodiment of the present invention formally performs adjustment with respect to this problem, and has already resolved the problem.

According to the apparatus for processing interference in a massive multiple-input multiple-output system provided in this embodiment of the present invention, after a combined outer precoder set and a use probability of each combined outer precoder are obtained, internal adjustment is further performed according to the obtained information, so that the apparatus can obtain an equivalent channel, and further determine, according to the equivalent channel, a quantity of pilots and a quantity of RF (Radio Frequency) radio frequency links needed in the massive multiple-input multiple-output system. A dimension of the equivalent channel in this embodiment of the present invention is significantly less than a quantity of antennas in the massive multiple-input multiple-output system, which thereby significantly reduces the quantity of pilots and the quantity of RF radio frequency links needed in the massive multiple-input multiple-output system.

It should be noted that with reference to the descriptions of the apparatus 01 for processing interference in a massive multiple-input multiple-output system and the apparatus 02 for processing interference in a massive multiple-input multiple-output system, the calculation of the combined outer precoder set is completed by the apparatus 01; after completing the calculation, the apparatus 01 sends the outer precoder obtained by the calculation to the apparatus 02; and an actual outer precoding process is implemented in the apparatus 02.

Specifically, with reference to the descriptions of the foregoing embodiments, the apparatus 01 is preferably an RRMS, and the apparatus 02 is preferably a base station; then, the RRMS is responsible for calculating a combined outer precoder set, while the actual outer precoding process is implemented in each base station by using an RF phase shifter. For a given outer precoder matrix F_n, how an outer precoding process is specifically implemented in a base station by using an RF phase shifter is not described in detail in this embodiment of the present invention.

Figure 5:
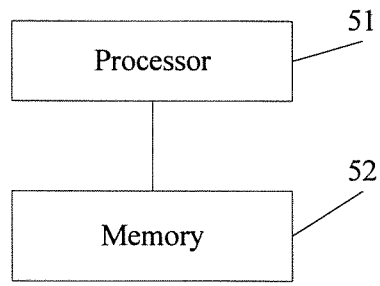
FIG. 5 is a schematic composition diagram of an apparatus for processing interference in a massive multiple-input multiple-output system according to another embodiment of the present invention.

An embodiment of the present invention provides an apparatus for processing interference in a massive multiple-input multiple-output system. As shown in FIG. 5, the apparatus 03 includes: a processor 51 and a memory 52.

The processor 51 is configured to obtain channel correlation matrixes of all links, and calculate a combined outer precoder set by using the channel correlation matrixes of all links.

The channel correlation matrixes of all links refer to channel correlation matrixes of all users in all cells in the massive multiple-input multiple-output system, and a channel correlation matrix indicates a quantity of base station antennas that can be received by users served by each base station. The obtained channel correlation matrixes change slowly, and are not sensitive to a delay. Each combined outer precoder includes at least one outer precoder.

It should be noted that outer precoders are designed according to the channel correlation matrixes of the links in the system, the outer precoders are not sensitive to a backhaul delay, and a function of the outer precoders is to cancel inter-cell interference. The outer precoders are not sensitive to a backhaul delay because the outer precoders are adaptive to only the channel correlation matrixes and are unrelated to real-time channel state information. Because the channel correlation matrixes usually change significantly only after hundreds or even thousands of radio frames, the outer precoders are not sensitive to a delay.

For example, the users estimate the channel correlation matrixes at a moment 0. It is assumed that due to a processing and transmission delay, a radio resource management server RRMS (Radio Resource Management Server) receives the channel correlation matrixes after a time T. However, because the channel correlation matrixes change quite slowly, channel correlation matrixes at a moment T are almost the same as the channel correlation matrixes at the moment 0. Therefore, current outer precoders may be designed for the RRMS according to the channel correlation matrixes at the moment 0, which means that the outer precoders are not sensitive to a delay.

The outer precoders of the base stations are semi-unitary matrixes.

Specifically, a semi-unitary matrix has the following features:

an M×S (M rows and S columns) semi-unitary matrix U meets the following features: (1) S<M; and (2) a product of a conjugate transpose of U and U is an S×S unit matrix.

For example, [1 0
0 1
0 0] is a semi-unitary matrix.

It should be noted that multiple combined outer precoders can be calculated according to the channel correlation matrixes of all links. Such multiple combined outer precoders are referred to as a combined outer precoder set, which is used to maximize a performance indicator of the massive multiple-input multiple-output system in this embodiment. A specific manner for calculating the outer precoders are related to a selected system performance indicator. Common system performance indicators include a system throughput and proportional fairness.

The memory 52 is configured to store the combined outer precoder set obtained through calculation according to the channel correlation matrixes of all links obtained by the processor 51.

Optionally, the processor 51 is further configured to determine, by using the channel correlation matrixes of all links, a use probability corresponding to each combined outer precoder.

The use probability corresponding to each combined outer precoder is calculated. The calculation of the use probability is determined by a system performance indicator, and a specific calculation method is related to a specific application and a selected system performance indicator. The use probability and the combined outer precoder set maximize the performance indicator of the massive multiple-input multiple-output system.

Further, the memory 51 is further configured to store the use probability corresponding to each combined outer precoder obtained by the processor 51 through calculation.

Figure 6:
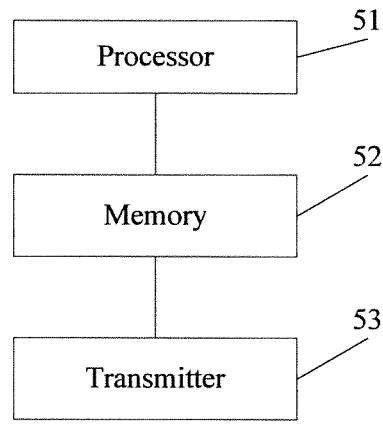
FIG. 6 is a schematic composition diagram of an apparatus for processing interference in a massive multiple-input multiple-output system according to another embodiment of the present invention.

Optionally, as shown in FIG. 6, the apparatus further includes: a transmitter 53.

The transmitter 53 is configured to determine a super frame, and send the combined outer precoder set and the use probability of each combined outer precoders that are obtained by the processor 51 to a base station in the super frame.

The super frame includes one or more radio frames.

It should be noted that a super frame is an updating period of the outer precoders.

The outer precoders are not static, but need to be constantly adjusted in a self-adaptive manner according to the channel correlation matrixes. In this embodiment, when each super frame begins, an outer precoder matrix is calculated, and then remains unchanged during the entire super frame. However, after a next super frame begins, the channel correlation matrixes may have changed significantly, and outer precoder matrix calculation needs to be performed again.

It should be noted that the memory 52, the processor 51, and the transmitter 53 are connected to each other for communication by using a bus.

The memory 52 may be a read-only memory (Read Only Memory, ROM), a static storage device, a dynamic storage device, or a random access memory (Random Access Memory, RAM). The memory 52 may store an operating system and another application program. When the technical solutions provided in this embodiment of the present invention are implemented by using software or firmware, program code used to implement the technical solutions provided in this embodiment of the present invention is stored in the memory 52 and executed by the processor 51.

The processor 51 may be a general-purpose central processing unit (Central Processing Unit, CPU), a microprocessor, an application-specific integrated circuit (Application Specific Integrated Circuit, ASIC), or one or more integrated circuits, configured to execute a related program to implement the technical solutions provided in this embodiment of the present invention.

The bus may include a path, to transmit information between components of the apparatus.

It should be noted that although only the memory 52 and the processor 51 are shown as hardware in FIG. 5 and FIG. 6, in a specific implementation process, a person skilled in the art should understand that the terminal also includes another device required for normal running. In addition, according to a specific requirement, a person skilled in the art should understand that a hardware device implementing another function may also be included.

According to the apparatus for processing interference in a massive multiple-input multiple-output system provided in this embodiment of the present invention, a processor obtains channel correlation matrixes of all links, then calculates a combined outer precoder set by using the obtained channel correlation matrixes of all links, calculates a use probability of each combined outer precoder, and sends the combined outer precoder set and the use probability of the combined outer precoder to a base station. An outer precoder in this embodiment of the present invention is not sensitive to a backhaul delay, which significantly reduces an error in channel state information obtained by the base station, and further can significantly cancel inter-cell interference.

Figure 7:
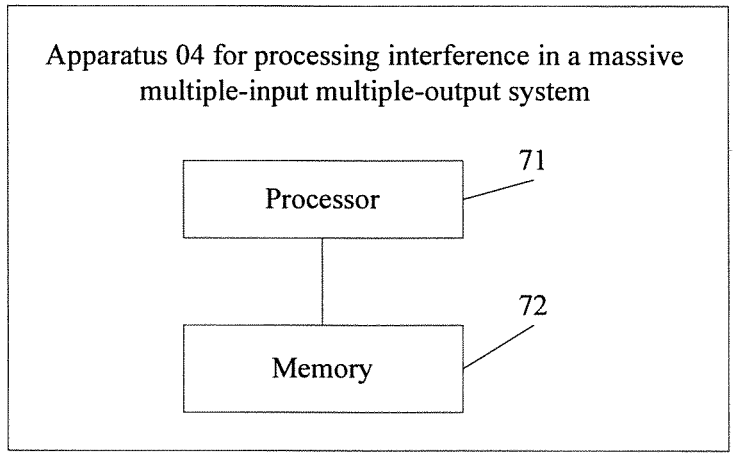
FIG. 7 is a schematic composition diagram of another apparatus for processing interference in a massive multiple-input multiple-output system according to another embodiment of the present invention.

Another embodiment of the present invention provides an apparatus for processing interference in a massive multiple-input multiple-output system. As shown in FIG. 7, the apparatus 04 includes: a processor 71 and a memory 72.

The processor 71 is configured to obtain a combined outer precoder set and a use probability of each combined outer precoder.

The combined outer precoder includes at least one outer precoder, the outer precoder is not sensitive to a backhaul delay, and the outer precoder is a semi-unitary matrix.

It should be noted that outer precoders of base stations in a same combined outer precoder are used simultaneously, and therefore, use probabilities of the outer precoders of the base stations in the same combined outer precoder are the same.

Specifically, a manner used by the processor 71 to obtain the combined outer precoder set and the use probability of each combined outer precoder may be: directly obtaining the combined outer precoder set and the use probability of each combined outer precoders that are received by a receiver.

Besides, each base station needs to receive only an outer precoder of the base station in the combined outer precoder and a corresponding use probability, and does not need to receive outer precoders of other base stations.

For example, the massive multiple-input multiple-output system includes only two base stations: a base station 1 and a base station 2, and the calculated combined outer precoder set has three combined outer precoders: {F1(1), F2(1)}, {F1(2), F2(2)}, and {F1(3), F2(3)}, where Fn(j) represents an outer precoder of the $n^{th}$ base station in the $j^{th}$ combined outer precoder. In addition, it is assumed that use probabilities of the three combined outer precoders are respectively q1, q2, and q3.

The base station 1 needs to know only F1(1), F1(2), F1(3), and the use probabilities q1, q2, and q3, and does not need to know F2(1), F2(2), or F2(3). Generation of a pseudo-random sequence relies only on the use probabilities q1, q2, and q3, and is unrelated to specific values of the outer precoders. For example, a "pseudo-random sequence" generated by the base station 1 (and the base station 2) is {2, 1, 3, 1 . . . }. In this example, the base stations 1 and 2 generate the same pseudo-random sequences according to a same rule. Then, in the first radio frame, the base station 1 uses F1(2) as an outer precoder, while the base station 2 uses F2(2) as an outer precoder; in the second radio frame, the base station 1 uses F1(1) as an outer precoder, while the base station 2 uses F2(1) as an outer precoder; in the third radio frame, the base station 1 uses F1(3) as an outer precoder, while the base station 2 uses F2(3) as an outer precoder; in the fourth radio frame, the base station 1 uses F1(1) as an outer precoder, while the base station 2 uses F2(1) as an outer precoder. Therefore, each base station needs to know only its own outer precoder set and use probabilities.

The memory 72 is configured to store the combined outer precoder set and the use probability of the combined outer precoder that are obtained by the processor 71.

Optionally, the processor 71 is configured to determine, according to the combined outer precoder set and the use probability of each combined outer precoder that are obtained, an outer precoder currently used by a base station, and perform calculation by using the currently used outer precoder, to obtain an equivalent channel; and is further configured to perform calculation by using the equivalent channel, to obtain an inner precoder.

A dimension of the involved equivalent channel is represented by a numeric value, and the numeric value is equal to a rank of the outer precoder. Because the outer precoder is a matrix, the rank of the outer precoder is equal to a quantity of columns of the outer precoder matrix.

Besides, in this embodiment, the inner precoder is a matrix. For example, if a base station has K scheduled users, and a dimension of a current outer precoder of the base station is S, the inner precoder is an S×K matrix (a matrix of S rows and K columns). The inner precoder is used to cancel interference between the K scheduled users. The inner precoder may be obtained through calculation according to the equivalent channel by using different design criteria. The calculation criteria include but are not limited to a zero forcing criterion or an MMSE (Minimum Mean Square Error, minimum mean square error) criterion.

Specifically, the processor 71 is further configured to generate a pseudo-random sequence by using the combined outer precoders in the combined outer precoder set and the use probability of each combined outer precoder.

A length value of the pseudo-random sequence is equal to a quantity of radio frames included in a super frame, and a value of each element of the pseudo-random sequence is included in $\{1, 2, 3 \ldots, J\}$, where J is a size of the combined outer precoder set, and a probability of each element value being j is equal to a use probability of the $j^{th}$ combined outer precoder.

The super frame is a time period during which the combined outer precoder set and the use probability of the combined outer precoder are obtained, and the super frame includes one or more radio frames.

Specifically, with reference to the foregoing description of the pseudo-random sequence, if a current radio frame is the first radio frame of a current super frame, the $n^{th}$ base station determines, according to the first element in the pseudo-random sequence, an outer precoder used in the current radio frame. For example, if the first element in a current pseudo-random sequence is j_1, the base station uses the $n^{th}$ outer precoder in the $(j\_1)^{th}$ combined outer precoder in the combined outer precoder set.

With reference to the foregoing example, the $n^{th}$ base station needs to use only the $n^{th}$ outer precoder in the combined outer precoder, and therefore does not need to know outer precoders of other base stations in the combined outer precoder. For example, a value of each element of the pseudo-random sequence is included in $\{1, 2, 3 \ldots, J\}$, where J is a size of the combined outer precoder set, and a probability of each element value being j is equal to a use probability of the $j^{th}$ combined outer precoder.

The processor 71 is further configured to determine the currently used outer precoder according to a location of a current radio frame in the super frame and the pseudo-random sequence.

Further, the processor 71 is further configured to determine the equivalent channel of a user according to the determined currently used outer precoder.

Preferably, the equivalent channel is obtained by using a product of an original channel and the outer precoder, and the equivalent channel completes data communication between user equipment and a base station, in place of the original channel. For example, if an outer precoder matrix of the $n^{th}$ base station is F_n, and a channel between the $n^{th}$ base station and the $k^{th}$ user is H_k,n, an equivalent channel between the $n^{th}$ base station and the $k^{th}$ user is F_n*H_k,n.

It should be noted that the dimension of the equivalent channel is equal to a rank of the outer precoder matrix, and is far less than a quantity of base station antennas. Besides, the equivalent channel is used to cancel interference between multiple users in a cell and implement multi-user transmission through spatial multiplexing of a base station.

Further, the processor 71 is further configured to schedule a user by using the equivalent channel and a service queue status, and calculate the inner precoder by using the current user scheduling and the equivalent channel of the scheduled user.

It should be noted that the base station maintains a service queue status for each user, that is, a service queue is located in the base station, and therefore, each base station knows a service queue status of a user served by the base station.

Both a system throughput and fairness between users need to be considered during user scheduling. A user scheduling calculation method includes but is not limited to an existing user scheduling solution in an LTE (Long-term evolution, Long Term Evolution) system. The user scheduling calculation method may be designed flexibly, and is not limited in this embodiment of the present invention.

It should be noted that both a system throughput and tallness between users need to be considered during the scheduling, to ensure that more users can perform normal services.

It should be noted that the processor 71 and the memory 72 are connected to each other for communication by using a bus.

The processor 71 may be a general-purpose central processing unit (Central Processing Unit, CPU), a microprocessor, an application-specific integrated circuit (Application Specific Integrated Circuit, ASIC), or one or more integrated circuits, configured to execute a related program, to implement the technical solutions provided in this embodiment of the present invention.

The memory 72 may be a read-only memory (Read Only Memory, ROM), a static storage device, a dynamic storage device, or a random access memory (Random Access Memory, RAM). The memory 72 may store an operating system and another application program. When the technical solutions provided in this embodiment of the present invention are implemented by using software or firmware, program code used to implement the technical solutions provided in this embodiment of the present invention is stored in the memory 72 and executed by the processor 71.

The bus may include a path, to transmit information between components of the apparatus.

It should be noted that although only the processor 71 and the memory 72 are shown as hardware in FIG. 7, in a specific implementation process, a person skilled in the art should understand that the terminal also includes another device required for no/mal running. In addition, according to a specific requirement, a person skilled in the art should understand that a hardware device implementing another function may also be included.

According to the apparatus for processing interference in a massive multiple-input multiple-output system provided in this embodiment of the present invention, after a receiver receives a combined outer precoder set and a use probability of each combined outer precoder that are sent by an RRMS, a processor performs internal adjustment according to the received information, so that the apparatus can obtain an equivalent channel, and then determine a quantity of pilots and a quantity of RF radio frequency links needed in the massive multiple-input multiple-output system by using the equivalent channel. A dimension of the equivalent channel in this embodiment of the present invention is significantly less than a quantity of antennas in the massive multiple-input multiple-output system, which thereby significantly reduces the quantity of pilots and the quantity of RF radio frequency links needed in the massive multiple-input multiple-output system.

Figure 8:
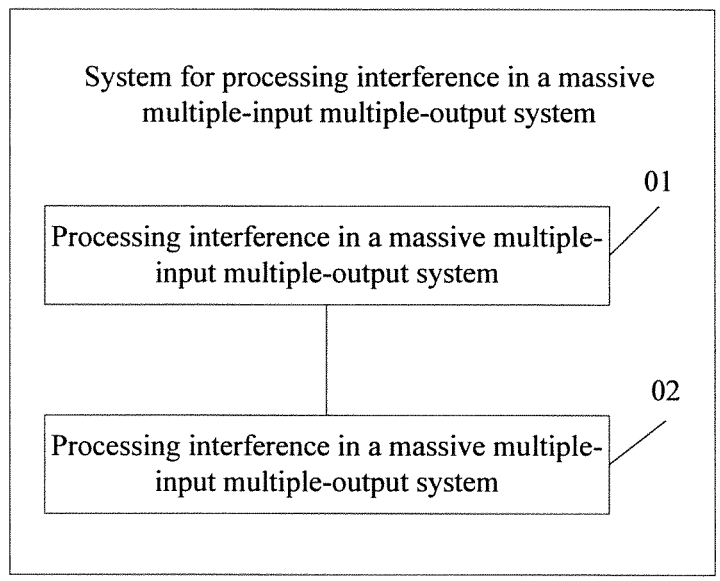
FIG. 8 is a schematic composition diagram of a system for processing interference in a massive multiple-input multiple-output system according to another embodiment of the present invention.

Another embodiment of the present invention provides a system for processing interference in a massive multiple-input multiple-output system. As shown in FIG. 8, the system includes the apparatus 01 for processing interference in a massive multiple-input multiple-output system described in FIG. 1 or FIG. 2 and the apparatus 02 for processing interference in a massive multiple-input multiple-output system described in FIG. 3 or FIG. 4.

Figure 9:
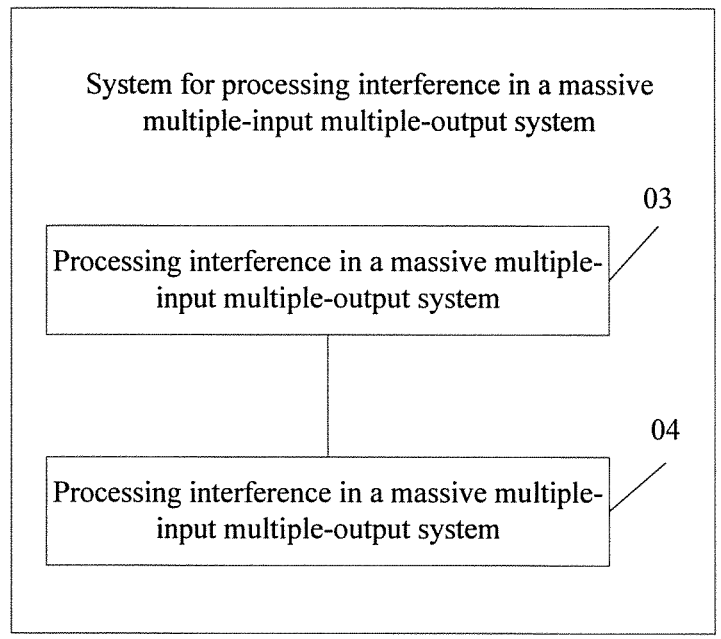
FIG. 9 is a schematic composition diagram of a system for processing interference in a massive multiple-input multiple-output system according to another embodiment of the present invention.

Another embodiment of the present invention provides a system for processing interference in a massive multiple-input multiple-output system. As shown in FIG. 9, the system includes the apparatus 05 for processing interference in a massive multiple-input multiple-output system described in FIG. 5 or FIG. 6 and the apparatus for processing interference in a massive multiple-input multiple-output system described in FIG. 7.

Figure 10:
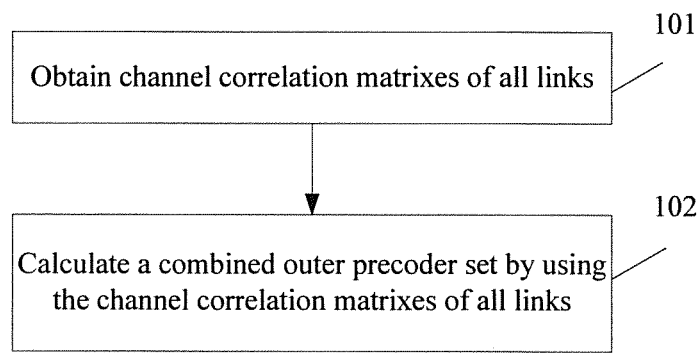
FIG. 10 is a flowchart of a method for processing interference in a massive multiple-input multiple-output system according to another embodiment of the present invention.

An embodiment of the present invention provides a method for processing interference in a massive multiple-input multiple-output system. As shown in FIG. 10, the method includes:

101: Obtain channel correlation matrixes of all links.

The channel correlation matrixes of all links refer to channel correlation matrixes of all users in all cells in the massive multiple-input multiple-output system, and a channel correlation matrix indicates a quantity of base station antennas that can be received by users served by each base station.

It should be noted that the obtained channel correlation matrixes change slowly and are not sensitive to a delay.

Specifically, each user sends only a channel correlation matrix of the user to a base station of a cell to which the user belongs, that is, each base station receives channel correlation matrixes of users of a local cell, and then each base station sends the collected channel correlation matrixes of the users of the cell to an RRMS.

Besides, it should be noted that, channel correlation matrixes that an edge user of a cell needs to feed back to a base station of the cell include a channel correlation matrix between the base station of the cell and the edge user, that is, a channel correlation matrix of a direct link direct link, and a channel correlation matrix between a neighboring base station and the edge user, that is, a channel correlation matrix of a cross link cross link; correspondingly, a non-edge user of a cell needs to feed back only a channel correlation matrix of a direct link to a base station of the cell.

102: Calculate a combined outer precoder set by using the channel correlation matrixes of all links.

Each combined outer precoder includes at least one outer precoder, and the outer precoder is not sensitive to a backhaul delay.

The outer precoders obtained through calculation are outer precoders of all base stations, and the outer precoders of all base stations are designed according to the channel correlation matrixes of all links in the system. The outer precoders are not sensitive to a backhaul delay, and a function of the outer precoders is to cancel inter-cell interference.

It should be noted that the outer precoders are not sensitive to a backhaul delay because the outer precoders are adaptive to only the channel correlation matrixes and are unrelated to channel state information. Because the channel correlation matrixes usually change significantly only after hundreds or even thousands of radio frames, the outer precoders are not sensitive to a delay. For example, the users estimate the channel correlation matrixes at a moment 0. It is assumed that due to a processing and transmission delay, an RRMS receives the channel correlation matrixes after a time T. However, because the channel correlation matrixes change quite slowly, channel correlation matrixes at a moment T are almost the same as the channel correlation matrixes at the moment 0. Therefore, current outer precoders may be designed for the RRMS according to the channel correlation matrixes at the moment 0, which means that the outer precoders are not sensitive to a delay.

The outer precoders of the base stations are semi-unitary matrixes.

Specifically, a semi-unitary matrix has the following features:

an M×S (M rows and S columns) semi-unitary matrix U meets the following features: (1) S<M; and (2) a product of a conjugate transpose of U and U is an S×S unit matrix.

For example, [1 0
0 1
0 0] is a semi-unitary matrix.

It should be noted that there may be multiple elements in the semi-unitary matrix, which is not described in this embodiment of the present invention.

For ease of description, a combination of outer precoders of all base stations is referred to as a combined outer precoder set.

It should be noted that multiple combined outer precoders can be calculated according to the channel correlation matrixes of all links. Such multiple combined outer precoders are referred to as a combined outer precoder set, which is used to maximize a performance indicator of the massive multiple-input multiple-output system in this embodiment. A specific manner for calculating the outer precoders are related to a selected system performance indicator. Common system performance indicators include a system throughput and proportional fairness.

According to the method for processing interference in a massive multiple-input multiple-output system provided in this embodiment of the present invention, outer precoders are obtained through calculation according to obtained channel correlation matrixes of all links. According to the technical solutions provided in this embodiment of the present invention, inter-cell interference can be significantly cancelled without a need of exchanging delay-sensitive information between base stations.

Figure 11:
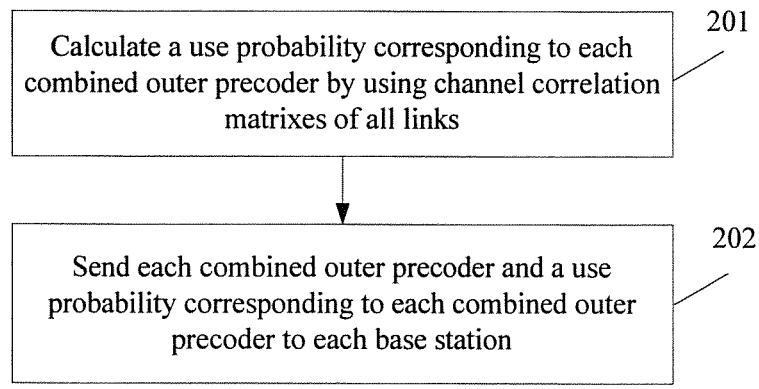
FIG. 11 is a flowchart of a method for processing interference in a massive multiple-input multiple-output system according to another embodiment of the present invention.

Another embodiment of the present invention provides a method for processing interference in a massive multiple-input multiple-output system. As shown in FIG. 11, the method includes:

201: Calculate, by using channel correlation matrixes of all links, a use probability corresponding to each combined outer precoder.

The use probability corresponding to each combined outer precoder is calculated. The calculation of the use probability is determined by a system performance indicator, and a specific calculation method is related to a specific application and a selected system performance indicator. The use probability and the combined outer precoder set maximize the performance indicator of the massive multiple-input multiple-output system.

Further, with reference to the outer precoders obtained through calculation in 102 in the foregoing embodiment, the following 202 is executed.

202: Send each combined outer precoder and the use probability corresponding to each combined outer precoder to base stations.

It should be noted that the foregoing process of executing 202 is completed in a super frame, where the super frame includes one or more radio frames, and a super frame is an updating period of the outer precoders.

The outer precoders are not static, but need to be constantly adjusted in a self-adaptive manner according to the channel correlation matrixes. In this embodiment, when each super frame begins, an outer precoder matrix is calculated, and then remains unchanged during the entire super frame. However, after a next super frame begins, the channel correlation matrixes may have changed significantly, and outer precoder matrix calculation needs to be performed again.

Besides, each base station needs to receive only an outer precoder of the base station in the combined outer precoder and a corresponding use probability, and does not need to receive outer precoders of other base stations.

For example, the massive multiple-input multiple-output system includes only two base stations: a base station 1 and a base station 2, and the calculated combined outer precoder set has three combined outer precoders: {F1(1), F2(1)}, {F1(2), F2(2)}, and {F1(3), F2(3)}, where Fn(j) represents an outer precoder of the $n^{th}$ base station in the $j^{th}$ combined outer precoder. In addition, it is assumed that use probabilities of the three combined outer precoders are respectively q1, q2, and q3.

The base station 1 needs to know only F1(1), F1(2), F1(3), and the use probabilities q1, q2, and q3, and does not need to know F2(1), F2(2), or F2(3). Generation of a pseudo-random sequence relies only on the use probabilities q1, q2, and q3, and is unrelated to specific values of the outer precoders. For example, a "pseudo-random sequence" generated by the base station 1 (and the base station 2) is {2, 1, 3, 1 . . . }. In this example, the base stations 1 and 2 generate the same pseudo-random sequences according to a same rule. Then, in the first radio frame, the base station 1 uses F1(2) as an outer precoder, while the base station 2 uses F2(2) as an outer precoder; in the second radio frame, the base station 1 uses F1(1) as an outer precoder, while the base station 2 uses F2(1) as an outer precoder; in the third radio frame, the base station 1 uses F1(3) as an outer precoder, while the base station 2 uses F2(3) as an outer precoder; in the fourth radio frame, the base station 1 uses F1(1) as an outer precoder, while the base station 2 uses F2(1) as an outer precoder. Therefore, each base station needs to know only its own outer precoder set and use probabilities.

It should be noted that outer precoders of base stations in a same combined outer precoder are used simultaneously, and therefore, use probabilities of the outer precoders of the base stations in the same combined outer precoder are the same.

Another embodiment of the present invention provides a method for suppressing interference in a massive multiple-input multiple-output system. The method is applied to a base station.

In this embodiment, the base station needs to cancel interference between multiple users in a local cell according to CSI of a part of the cell. In the prior art, with the increase in a quantity of base station antennas, a dimension of CSI that needs to be estimated exceeds a quantity of available pilots in a channel coherent time, which causes a relatively great error in estimated CSI learned by the base station; consequently, interference in the cell cannot be cancelled. The dimension of the CSI is equal to the quantity of antennas. In a massive antenna system, the quantity of antennas, that is, the dimension of the CSI, is far greater than a dimension of an equivalent channel.

To resolve this problem, the following solutions are proposed in the technical solution of the present invention with reference to the foregoing embodiments.

Figure 12:
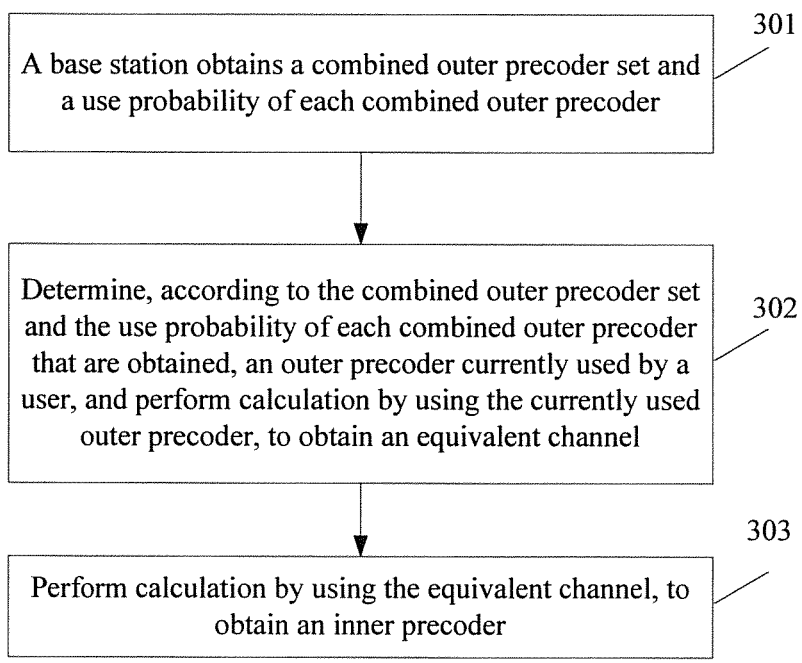
FIG. 12 is a flowchart of a method for processing interference in a massive multiple-input multiple-output system according to another embodiment of the present invention.

As shown in FIG. 12, the method includes:

301: A base station obtains a combined outer precoder set and a use probability of each combined outer precoder.

It should be noted that a manner used by the base station to obtain the combined outer precoder set and the use probability of each outer precoder may be: directly obtaining the combined outer precoder set and the use probability of each combined outer precoder that are sent by an RRMS and received by the base station.

Besides, each base station needs to receive only an outer precoder of the base station in the combined outer precoder and a corresponding use probability, and does not need to receive outer precoders of other base stations.

302: Determine, according to the combined outer precoder set and the use probability of each combined outer precoder that are obtained, an outer precoder currently used by a user, and perform calculation by using the currently used outer precoder, to obtain an equivalent channel.

A dimension of the involved equivalent channel is represented by a numeric value, and the numeric value is equal to a rank of the outer precoder.

With reference to the foregoing description in 101, the outer precoder is a matrix, and the rank of the outer precoder is equal to a quantity of columns of the outer precoder matrix.

303: Perform calculation by using the equivalent channel, to obtain an inner precoder.

Specifically, the inner precoder is a matrix. For example, if a base station has K scheduled users, and a dimension of a current outer precoder of the base station is S, the inner precoder is an S×K matrix (a matrix of S rows and K columns). The inner precoder is used to cancel interference between the K scheduled users. The inner precoder may be obtained through calculation according to the equivalent channel by using different design criteria. The calculation criteria include but are not limited to a zero forcing criterion or an MMSE (Minimum Mean Square Error, minimum mean square error) criterion.

In the method for suppressing interference in a massive multiple-input multiple-output system provided in this embodiment of the present invention, a rank of an outer precoder determines a dimension of an equivalent channel, and a rank of the designed outer precoder is far less than a quantity of base station antennas. However, a quantity of pilots needed in this solution is determined only by the dimension of the equivalent channel, and is unrelated to the quantity of base station antennas. Therefore, the quantity of pilots required for channel estimation is significantly reduced, and a problem of insufficient pilots in the massive multiple-input multiple-output system is resolved.

Besides, it should be noted that in the technical solution of the present invention, a base station may implement outer precoding by using an RF phase shifter, and a quantity of RF links needed in this solution is determined only by the rank of the outer precoder, and is unrelated to the quantity of base station antennas. The rank of the designed outer precoder is far less than the quantity of base station antennas, and therefore, the quantity of needed RF radio frequency links is greatly reduced. In this way, the quantity of RF radio frequency links needed in the massive multiple-input multiple-output system is reduced by controlling the rank of the outer precoder.

It should be noted that the technical solution provided in the present invention reduces the quantity of pilots needed in the massive multiple-input multiple-output system, and also reduce the quantity of RF links needed in the massive multiple-input multiple-output system. That is, problems of insufficient pilots in an existing massive multiple-input multiple-output system and high system costs caused by a large quantity of RF radio frequency links needed in the massive multiple-input multiple-output system are resolved. Besides, the two problems are resolved by controlling the rank of the outer precoder, and a precondition for controlling the rank of the outer precoder is to use multi-time-scale precoding. The multi-time-scale precoding refers to short-time inner precoding and long-term outer precoding.

Another embodiment of the present invention provides a method for suppressing interference in a massive multiple-input multiple-output system. In this method, a procedure of determining a currently used outer precoder is described in detail.

Specifically, the determining procedure includes:

a: Generate a pseudo-random sequence by using a combined outer precoder set and a use probability of each combined outer precoder.

Specifically, a length value of the pseudo-random sequence is equal to a quantity of radio frames included in a super frame, and a value of each element of the pseudo-random sequence is included in $\{1, 2, 3 \ldots, J\}$, where J is a size of the combined outer precoder set, and a probability of each element value being j is equal to a use probability of the $j^{th}$ combined outer precoder. Content of the super frame is the same as related content of the foregoing described super frame, and is not described repeatedly herein.

b: Determine a currently used combined outer precoder according to a location of a current radio frame in a super frame and the pseudo-random sequence.

Specifically, with reference to the foregoing description of the pseudo-random sequence in a, if the current radio frame is the first radio frame of the current super frame, the $n^{th}$ base station determines, according to the first element in the pseudo-random sequence, an outer precoder used in the current radio frame. For example, if the first element in a current pseudo-random sequence is j_l, the base station uses the $n^{th}$ outer precoder in the $(j\_l)^{th}$ combined outer precoder in the combined outer precoder set.

With reference to the foregoing example, the $n^{th}$ base station needs to use only the $n^{th}$ outer precoder in the combined outer precoder, and therefore does not need to know outer precoders of other base stations in the combined outer precoder.

Further, after determining the currently used outer precoder, the base station determines an equivalent channel of a user by using the outer precoder.

Preferably, the equivalent channel is obtained by using a product of an original channel and the outer precoder, and the equivalent channel completes data communication between user equipment and a base station, in place of the original channel. For example, if an outer precoder matrix of the $n^{th}$ base station is F_n, and a channel between the $n^{th}$ base station and the $k^{th}$ user is H_k,n, an equivalent channel between the $n^{th}$ base station and the $k^{th}$ user is F_n*H_k,n.

It should be noted that a dimension of the equivalent channel is equal to a rank of the outer precoder matrix, and is far less than a quantity of base station antennas. Besides, the equivalent channel is used to cancel interference between multiple users in a cell and implement multi-user transmission through spatial multiplexing of a base station.

c: Perform user scheduling according to the equivalent channel and a service queue status.

It should be noted that the base station maintains a service queue status for each user, that is, a service queue is located in the base station, and therefore, each base station knows a service queue status of a user served by the base station.

Both a system throughput and fairness between users need to be considered during user scheduling. A user scheduling calculation method includes but is not limited to an existing user scheduling solution in an LTE (Long-term evolution, Long Term Evolution) system. The user scheduling calculation method may be designed flexibly, and is not limited in this embodiment of the present invention.

It should be noted that both a system throughput and fairness between users need to be considered during the scheduling, to ensure that more users can perform normal services.

d: Perform calculation by using the current user scheduling and information about an equivalent channel of a scheduled user, to obtain an inner precoder.

It should be noted that during the user scheduling, equivalent channel information of all users needs to be used; after the user scheduling is completed, only an inner precoder needs to be calculated for a scheduled user, and in this case, only equivalent channel information of the scheduled user needs to be used.

Specifically, a method for calculating the inner precoder may be designed flexibly, for example, a precoding solution in the LTE system may be used.

Another embodiment of the present invention provides a method for suppressing interference in a massive multiple-input multiple-output system. The method may be applied to a specific network architecture. The network architecture includes an RRMS and three base stations BSs: BS1, BS2, and BS3. Each base station includes any one or more user equipments. BS1, BS2, and BS3 can separately communicate with the RRMS.

Figure 13:
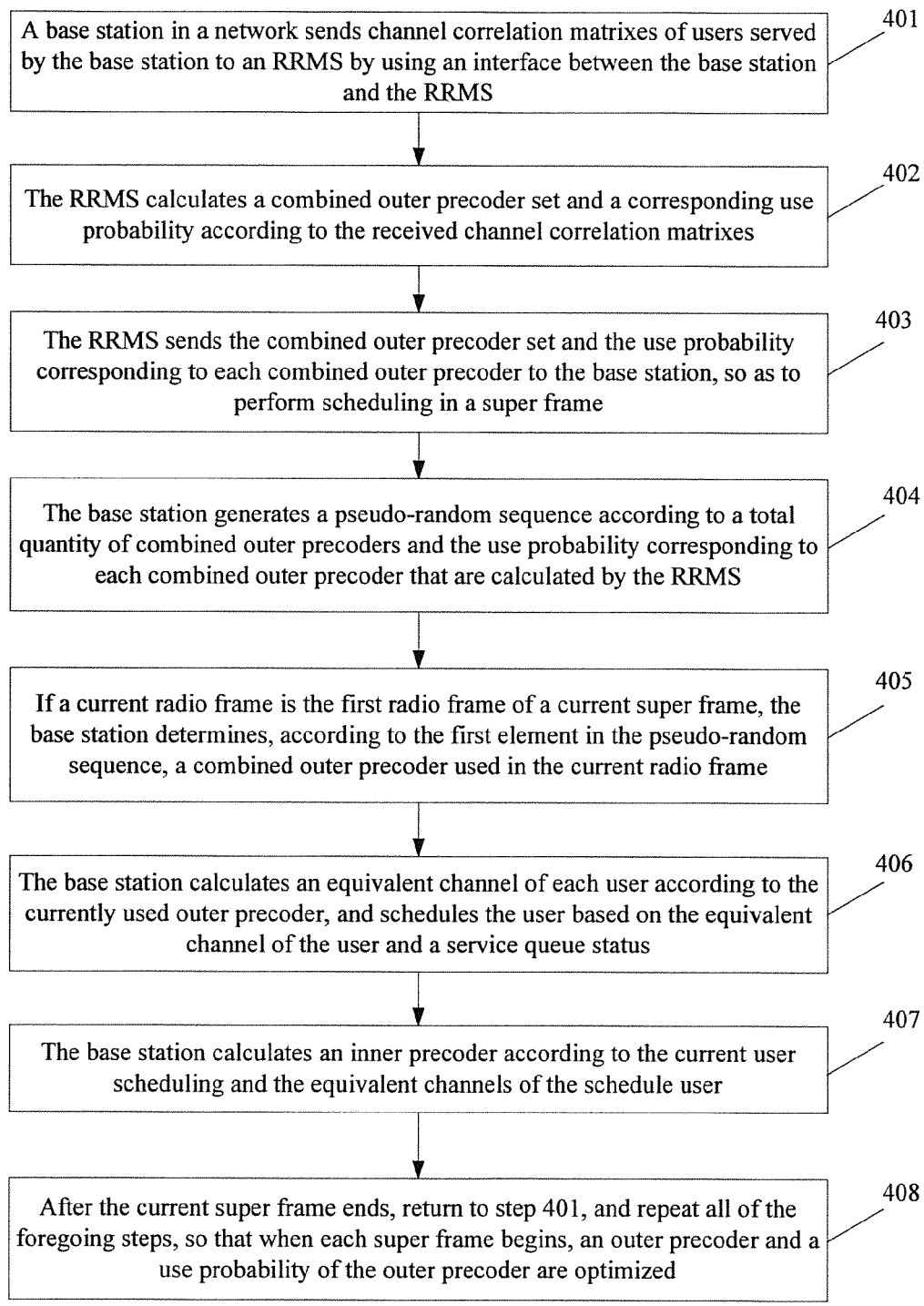
FIG. 13 is a flowchart of a method for processing interference in a massive multiple-input multiple-output system based on a specific example according to another embodiment of the present invention.

As shown in FIG. 13, the method includes:

401: A base station in a network sends channel correlation matrixes of users served by the base station to an RRMS by using an interface between the base station and the RRMS.

The RRMS is configured to coordinate transmission between base stations, and perform effective control and input for the base stations in a time granularity of "a relatively long time". It should be noted that "a relatively long time" is relative to a length of a radio frame. A time scale of "a relatively long time" in this embodiment of the present invention is equivalent to a changing time scale of the channel correlation matrixes, and usually includes hundreds or even thousands of radio frames.

Preferably, the RRMS is applied to a cellular network of a cell, and is configured to implement optimal network performance of the entire network.

402: After receiving feedback of the channel correlation matrixes from each base station node, the RRMS calculates a combined outer precoder set and a corresponding use probability according to the received channel correlation matrixes.

403: The RRMS sends the combined outer precoder set and the use probability corresponding to each combined outer precoder to each base station, so as to perform scheduling in a super frame.

It should be noted that the $n^{th}$ base station needs to receive only the $n^{th}$ outer precoder in each combined outer precoder and a corresponding use probability.

The super frame is formed by L radio frames.

404: The base station generates a pseudo-random sequence according to the combined outer precoders and the use probability corresponding to each combined outer precoder that are calculated by the RRMS.

It should be noted that pseudo-random sequences generated by all base stations are the same.

405: If a current radio frame is the first radio frame of a current super frame, the base station determines, according to the first element in the pseudo-random sequence, a combined outer precoder used in the current radio frame.

For example, if the first element in a current pseudo-random sequence is j_1, the $n^{th}$ base station uses the $n^{th}$ outer precoder in the $(j\_1)^{th}$ combined outer precoder in the combined outer precoder set.

406: The base station calculates an equivalent channel of each user according to a currently used outer precoder, and schedules the user based on the equivalent channel of the user and a service queue status.

407: The base station calculates an inner precoder by using the current user scheduling and the equivalent channel of the scheduled user.

408: After the current super frame ends, return to step 401, and repeat all of the foregoing steps, so that when each super frame begins, outer precoders and use probabilities of the outer precoders are optimized.

It should be noted that a super frame is an updating period of a combined outer precoder set and a corresponding use probability. The combined outer precoder set and the corresponding use probability are not static, but need to be constantly adjusted in a self-adaptive manner according to the channel correlation matrixes. When each super frame begins, the combined outer precoder set and the corresponding use probability are calculated, and then remain unchanged during the entire super frame. However, after a next super frame begins, the channel correlation matrixes may have changed significantly. Therefore, a combined outer precoder set and a corresponding use probability need to be calculated again, that is, the step described in the foregoing 408 needs to be executed.

According to the method, apparatus, and system for processing interference in a massive multiple-input multiple-output system that are provided in the embodiments of the present invention, a radio resource management server obtains channel correlation matrixes of all links, calculates a combined outer precoder set according to these channel correlation matrixes, where each combined outer precoder includes at least one outer precoder, and the outer precoder is a semi-unitary matrix, and sends the combined outer precoder set to a base station, so that the base station can perform adjustment according to the combined outer precoder set. The technical solutions provided in the embodiments of the present invention overcome a disadvantage of sensitivity to a backhaul delay during an inter-cell interference cancellation process in a massive multiple-input multiple-output system.

Besides, in a process in which the base station performs adjustment, the technical solutions provided in the present invention reduce a quantity of pilots needed in the massive multiple-input multiple-output system, and also reduce a quantity of RF links needed in the massive multiple-input multiple-output system. That is, problems of insufficient pilots in an existing massive multiple-input multiple-output system and high system costs caused by a large quantity of RF radio frequency links needed in the massive multiple-input multiple-output system are resolved.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for processing interference in a massive multiple-input multiple-output system, the apparatus comprising:

a processor;

memory coupled to the processor, the memory comprising instructions that, when executed by the processor, cause the apparatus to:
obtain channel correlation matrixes of all links,
calculate a combined outer precoder set by using the obtained channel correlation matrixes of all links, wherein each combined outer precoder comprises at least one outer precoder, and the outer precoder is a semi-unitary matrix, and
calculate, by using the obtained channel correlation matrixes of all links, a use probability corresponding to each combined outer precoder.

2. The apparatus according to claim 1, wherein the memory further comprises instructions that, when executed by the processor, cause the apparatus to:
determine a super frame, and send the combined outer precoder set and the use probability of each combined outer precoder to a base station in the super frame.

3. An apparatus for processing interference in a massive multiple-input multiple-output system, the apparatus comprising:
a processor;
memory coupled to the processor, the memory comprising instructions that, when executed by the processor, cause the apparatus to:
obtain a combined outer precoder set and a use probability of each combined outer precoder, wherein the combined outer precoder comprises at least one outer precoder, and the outer precoder is a semi-unitary matrix,
determine a currently used outer precoder according to the combined outer precoder set and the use probability of each combined outer precoder that are obtained,
perform a first calculation by using the determined currently used outer precoder to obtain an equivalent channel, and
perform a second calculation by using the equivalent channel, to obtain an inner precoder.

4. The apparatus according to claim 3, wherein the memory further comprises instructions that, when executed by the processor, cause the apparatus to:
generate a pseudo-random sequence by using the combined outer precoder in the combined outer precoder set and the use probability of each combined outer precoder that are obtained, wherein a length value of the pseudo-random sequence is equal to a quantity of radio frames comprised in a super frame, the super frame is a time period during which the combined outer precoder set and the use probability of the combined outer precoder are obtained, and the super frame comprises one or more radio frames; and
determine the currently used outer precoder according to a location of a current radio frame in the super frame and the pseudo-random sequence.

5. The apparatus according to claim 3, wherein the memory further comprises instructions that, when executed by the processor, cause the apparatus to:
schedule a user by using a service queue status and the obtained equivalent channel; and
calculate the inner precoder by using the current user scheduling and the equivalent channel of the scheduled user.

6. An apparatus for processing interference in a massive multiple-input multiple-output system, the apparatus comprising:
a processor, configured to:
obtain channel correlation matrixes of all links, and calculate a combined outer precoder set by using the channel correlation matrixes of all links, wherein each combined outer precoder comprises at least one outer precoder, and the outer precoder is a semi-unitary matrix, and
calculate, by using the channel correlation matrixes of all links, a use probability corresponding to each combined outer precoder; and
a transmitter, configured to determine a super frame, and send the combined outer precoder set and the use probability of each combined outer precoder to a base station in the super frame.

7. An apparatus for processing interference in a massive multiple-input multiple-output system, the apparatus comprising:
a processor, configured to:
obtain a combined outer precoder set and a use probability of each combined outer precoder, wherein the combined outer precoder comprises at least one outer precoder, and the outer precoder is a semi-unitary matrix,
determine a currently used outer precoder according to the combined outer precoder set and the use probability of each combined outer precoder that are obtained;
perform calculation by using the currently used outer precoder, to obtain an equivalent channel; and
perform calculation by using the equivalent channel, to obtain an inner precoder.

8. The apparatus according to claim 7, wherein the processor is further configured to:
generate a pseudo-random sequence by using the combined outer precoder in the combined outer precoder set and the use probability of each combined outer precoder, wherein a length value of the pseudo-random sequence is equal to a quantity of radio frames comprised in a super frame, the super frame is a time period during which the combined outer precoder set and the use probability of the combined outer precoder are obtained, and the super frame comprises one or more radio frames; and
determine the currently used outer precoder according to a location of a current radio frame in the super frame and the pseudo-random sequence.

9. The apparatus according to claim 7, wherein the processor is further configured to:
schedule a user by using a service queue status and the equivalent channel, and calculate the inner precoder by using the current user scheduling and the equivalent channel of the scheduled user.

10. A method for processing interference in a massive multiple-input multiple-output system, the method comprising:
obtaining channel correlation matrixes of all links;
calculating a combined outer precoder set by using the channel correlation matrixes of all links, wherein each combined outer precoder comprises at least one outer precoder, and the outer precoder is a semi-unitary matrix;
calculating a use probability corresponding to each combined outer precoder by using the channel correlation matrixes of all links; and
determining a super frame, and sending the combined outer precoder set and the use probability of each combined outer precoder to a base station in the super frame.

11. A method for processing interference in a massive multiple-input multiple-output system, the method comprising:
- obtaining a combined outer precoder set and a use probability of each combined outer precoder, wherein the combined outer precoder comprises at least one outer precoder, and the outer precoder is a semi-unitary matrix;
- determining a currently used outer precoder according to the combined outer precoder set and the use probability of each combined outer precoder that are obtained, and performing calculation by using the currently used outer precoder, to obtain an equivalent channel; and
- performing calculation by using the equivalent channel, to obtain an inner precoder.

12. The method according to claim 11, wherein determining a currently used outer precoder comprises:
- generating a pseudo-random sequence by using the combined outer precoder in the combined outer precoder set and the use probability of each combined outer precoder, wherein a length value of the pseudo-random sequence is equal to a quantity of radio frames comprised in a super frame, the super frame is a time period during which the combined outer precoder set and the use probability of the combined outer precoder are obtained, and the super frame comprises one or more radio frames; and
- determining the currently used outer precoder according to a location of a current radio frame in the super frame and the pseudo-random sequence.

13. The method according to claim 11, wherein performing calculation by using the equivalent channel, to obtain an inner precoder comprises:
- scheduling a user by using a service queue status and the equivalent channel; and
- calculating the inner precoder by using the current user scheduling and the equivalent channel of the scheduled user.

* * * * *